US011923669B2

(12) United States Patent
Schoepf et al.

(10) Patent No.: US 11,923,669 B2
(45) Date of Patent: Mar. 5, 2024

(54) LIGHT FIXTURE MOUNTING BRACKET AND CANOPY ASSEMBLY

(71) Applicant: HLI SOLUTIONS, INC., Greenville, SC (US)

(72) Inventors: Jeffery Richard Schoepf, Marshfield Marshfield, MA (US); Timothy Scott Farrell, Simpsonville, SC (US)

(73) Assignee: HLI SOLUTIONS, INC., Greenville, SC (US)

( * ) Notice: Subject to any disclaimer, the term of this patent is extended or adjusted under 35 U.S.C. 154(b) by 20 days.

(21) Appl. No.: 17/325,799

(22) Filed: May 20, 2021

(65) Prior Publication Data
US 2021/0364151 A1 Nov. 25, 2021

Related U.S. Application Data

(60) Provisional application No. 63/027,684, filed on May 20, 2020.

(51) Int. Cl.
| H02G 3/08 | (2006.01) |
| H02G 3/14 | (2006.01) |
| F21V 15/01 | (2006.01) |
| F21V 17/12 | (2006.01) |
| F21V 21/02 | (2006.01) |

(52) U.S. Cl.
CPC ............... *H02G 3/14* (2013.01); *H02G 3/08* (2013.01); *H02G 3/086* (2013.01); *F21V 15/01* (2013.01); *F21V 17/12* (2013.01); *F21V 21/02* (2013.01)

(58) Field of Classification Search
CPC ............ H02G 3/14; H02G 3/08; H02G 3/086; H02G 3/081; H02G 3/10; H02G 3/12; F21V 15/01; F21V 17/12; F21V 21/02; H05K 5/00; H05K 5/02

USPC ..... 174/50, 520, 480, 481; 220/3.2, 3.3, 3.8, 220/4.02; 248/906; 362/145, 147, 148, 362/150

See application file for complete search history.

(56) References Cited

U.S. PATENT DOCUMENTS

| 4,448,388 | A | 5/1984 | Dennis et al. | |
| 5,606,147 | A * | 2/1997 | Deschamps | H02G 3/125 |
| | | | | 248/906 |
| 5,662,414 | A | 9/1997 | Jennings et al. | |
| 6,123,438 | A | 9/2000 | Hentz | |
| 7,064,269 | B2 * | 6/2006 | Smith | H01R 33/46 |
| | | | | 174/481 |
| 7,628,504 | B2 | 12/2009 | Glickman | |

(Continued)

OTHER PUBLICATIONS

PCT/US2021/033397 International Search Report and Written Opinion dated Aug. 26, 2021 (17 pages).

*Primary Examiner* — Angel R Estrada
(74) *Attorney, Agent, or Firm* — Buckley, Maschoff & Talwalkar LLC

(57) ABSTRACT

A canopy assembly for a light fixture includes a mounting bracket configured to be positioned over a junction box and directly mounted to a support surface. A canopy cover is connected to the mounting bracket. The canopy cover includes a plurality of conduit openings. One or more cover inserts are configured to be selectively positioned in the conduit openings. One or more conduit inserts are configured to be selectively positioned in the conduit openings. The canopy cover is configured to extend over the mounting bracket and the junction box.

20 Claims, 11 Drawing Sheets

(56) References Cited

U.S. PATENT DOCUMENTS

| | | | |
|---|---|---|---|
| 7,824,080 B2 * | 11/2010 | Gibson | F21V 15/01 |
| | | | 362/147 |
| 7,874,706 B2 * | 1/2011 | Carle, Jr. | F21S 8/02 |
| | | | 362/147 |
| 8,378,232 B2 | 2/2013 | Drane | |
| 8,820,983 B2 * | 9/2014 | Schmitt | F21V 21/045 |
| | | | 362/365 |
| 8,950,898 B2 * | 2/2015 | Catalano | F21S 8/026 |
| | | | 362/276 |
| 9,080,760 B1 | 7/2015 | Soderman et al. | |
| 10,907,806 B2 | 2/2021 | Behnke et al. | |
| 2008/0296458 A1 | 12/2008 | Gibson et al. | |

\* cited by examiner

LIGHT FIXTURE MOUNTING BRACKET AND CANOPY ASSEMBLY

FIELD

Various exemplary embodiments relate to mounting brackets for attaching light fixtures over a junction box and canopy assemblies that can be connected to such mounting brackets.

BACKGROUND

Mounted lighting fixtures such as surface, pendant, cord, ceiling, and wall mounted fixtures are popular in homes and businesses. One reason for the increased use of these light fixtures is that they can met a wide range of interior lighting requirements since they are not only functional, but also aesthetically pleasing. Such lighting fixtures are typically connected to a junction box where the fixture is electrically connected to a main power supply.

When possible, portions of the light fixture and the junction box are positioned inside of the mounting surface and hidden from view. In certain locations, however, recessed lighting and recessed junction boxes are not possible, and the light fixtures, junction box, and associated wiring conduits mush be positioned on an exterior of the mounting surface.

SUMMARY

According to certain aspects, a canopy assembly for a light fixture includes a mounting bracket configured to be positioned over a junction box and directly mounted to a support surface. A canopy cover is connected to the mounting bracket. The canopy cover includes a plurality of conduit openings. One or more cover inserts are configured to be selectively positioned in the conduit openings. One or more conduit inserts are configured to be selectively positioned in the conduit openings. The canopy cover is configured to extend over the mounting bracket and the junction box.

According to certain aspects, a canopy assembly for a light fixture includes a mounting bracket configured to be positioned over a junction box and directly mounted to a support surface. The mounting bracket has a central body, an upper arm extending from the central body in a first direction, and a lower arm extending from the central body in a second direction opposite the first direction. A canopy cover is connected to the mounting bracket. The canopy cover includes a plurality of conduit openings. One or more cover inserts are configured to be selectively positioned in the conduit openings. One or more conduit inserts are configured to be selectively positioned in the conduit openings. The canopy cover is configured to extend over the mounting bracket and the junction box.

According to certain aspects, a canopy assembly for a light fixture includes a mounting bracket configured to be positioned over a junction box and directly mounted to a support surface. The mounting bracket having a central body, an upper arm extending from the central body in a first direction, and a lower arm extending from the central body in a second direction opposite the first direction. A tray is connected to the lower arm beneath the central body. The tray supports a control component configured to be connected to a light emitter. A canopy cover is connected to the mounting bracket. The canopy cover including a plurality of conduit openings. One or more cover inserts are configured to be selectively positioned in the conduit openings. One or more conduit inserts are configured to be selectively positioned in the conduit openings.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Certain aspects are directed to mounting brackets for light assemblies and canopy assemblies for use with such mounting brackets. The mounting brackets can have various sizes and shapes depending on the specific application. The mounting brackets can be configured to attach so a support surface (e.g., a ceiling, wall, column, etc.) around a junction box to avoid interference with the junction box and the wiring contained therein. The canopy assemblies can be used with an interior light fixture that is typically installed to illuminate an area such as a room in a residential or commercial setting. The canopy assembly is configured to be attached to the support surface through a mounting bracket. The canopy assembly can be used in instances where the junction box must be placed on an exterior side (e.g., visible from the room) of a support surface, however it may also be used with recessed junction box applications.

Figure 1:
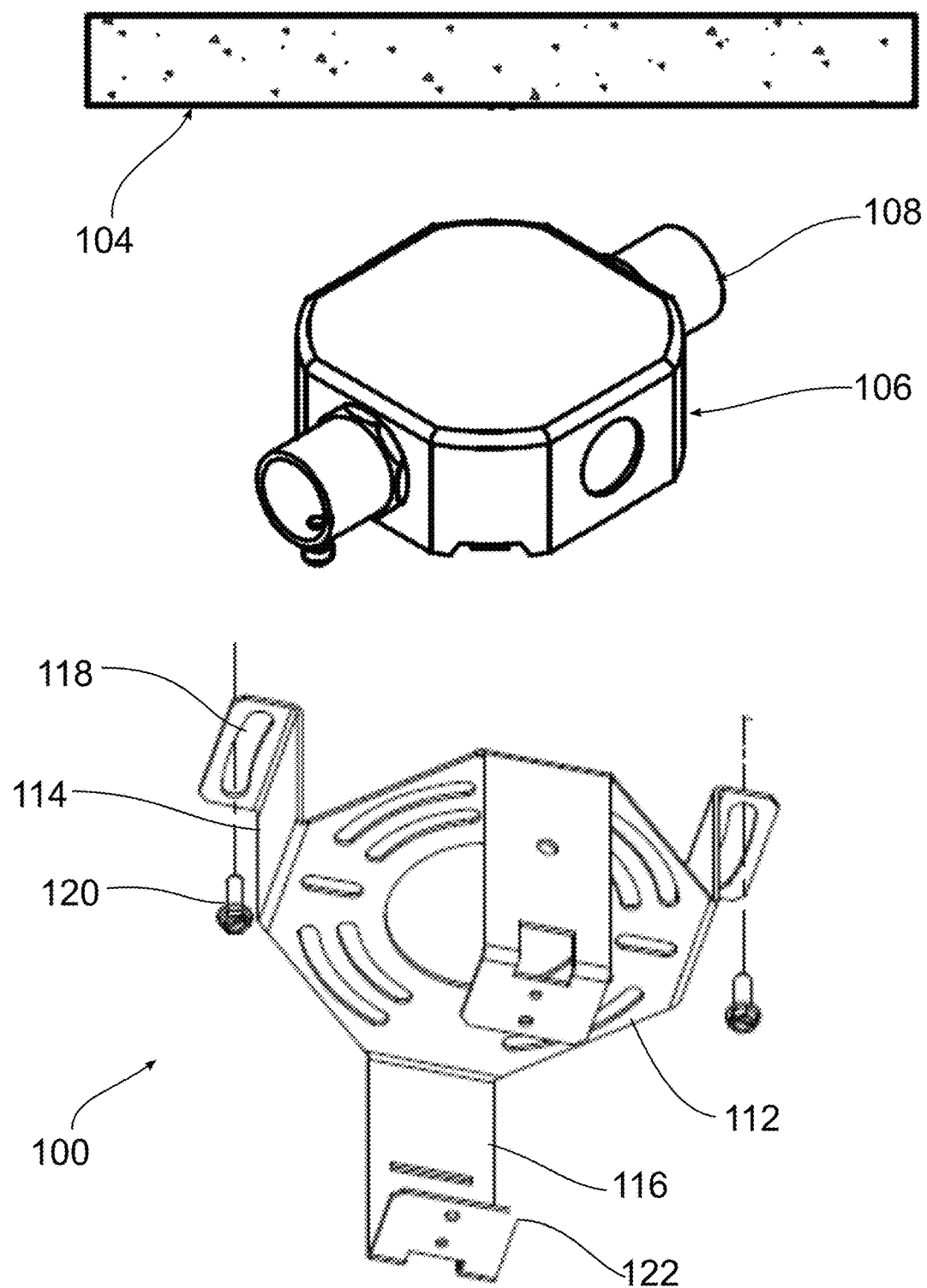
FIG. 1 is an assembly view of a support surface, junction box, and mounting bracket.

FIG. 1 shows an exemplary embodiment of a mounting bracket 100 for use with an interior light fixture that is typically installed to illuminate an area such as a room in a residential or commercial setting. The mounting bracket 100 is configured to be attached to a support surface 104 (e.g., a ceiling, wall, column, etc.) and to be positioned around a junction box 106.

The junction box 106 can be connected to the support surface 104 and receives one or more conduits 108. The junction box 106 can have any size or shape, with standardized size and shapes often used as known in the industry. The junction box 106 includes a top wall and one or more side walls that define an interior with a bottom opening. Knockouts are provided in the sidewalls that can be selectively removed so that a conduit 108 can be connected and placed in communication with the interior of the junction box 106. The conduits 108 can provide an enclosure for routing cables, such as main supply power conductors. In some embodiments, data/communication cables can also be present, although certain codes may require the separation of the two.

The mounting bracket 100 is positioned over and below the junction box 106. The mounting bracket 100 includes a central body 112, one or more upper arms 114, and one or more lower arms 116. The mounting bracket 100 is configured to directly engage and mount to the support surface 104, so that the mounting bracket 100 is not mounted to the junction box 106 and securing the mounting bracket 100 is independent of the junction box 106. This allows the mounting bracket 100 to be used with different sized junction boxes 106, and also eliminates the need to make a direct connection to the junction box 106 which can be difficult for an installer depending on the size and number of cables and connections present in the junction box.

The central body 112 of the mounting bracket 100 can act as a partial cover of the junction box 106 interior and can have a configuration that matches a certain size or type of junction box 106. The illustrated embodiment shows a central body 112 having an octagonal configuration corresponding to the junction box 106. Other sizes and shapes can also be used. The central body 112 has a series of slots and openings that can act as mounting apertures for other devices. A central opening extends through the central body 112 to allow conductors or other electrical connectors to extend from the junction box 106 and provide an electrical connection with a light fixture.

One or more upper arms 114 extend from the central body 112 toward the support surface 104. The illustrated embodiment includes two separate upper arms 114, however, a single arm or more than two arms can also be used. Upper flanges 118 are provided on each of the upper arms 114. The upper flanges 118 extend substantially orthogonal to the upper arms 114. Openings are provided in the upper flanges 118 to receive a fastener 120. The fastener 120 can extend through the upper flange 118 and into the support surface 104 to secure the mounting bracket 100 to the support surface 104.

One or more lower arms 116 extend from the central body 112 away from the support surface 104. The illustrated embodiment includes two separate lower arms 116, however, a single arm or more than two arms can also be used. Lower flanges 122 are provided on each of the lower arms 116. The lower flanges 122 extend substantially orthogonal to the lower arms 116. Openings are provided in the lower flanges 122 to receive a fastener. Other components, such as trays, brackets, or control components such as drivers, communication and control devices, and other components can also be connected to the bracket 100.

Figure 2:
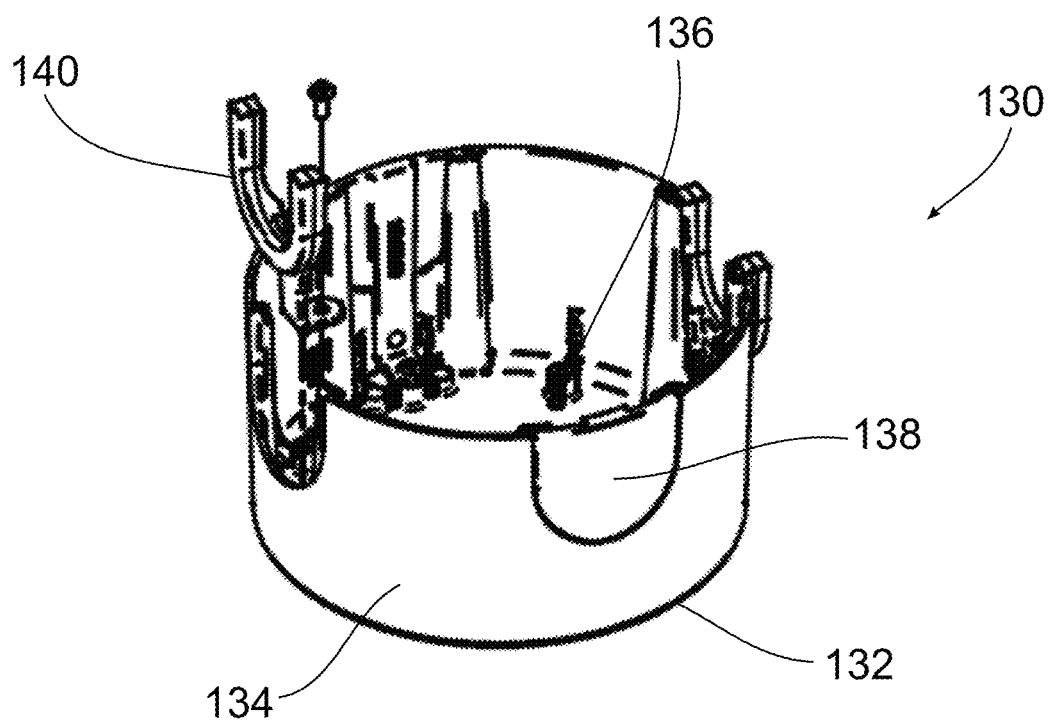
FIG. 2 is a perspective view of a curvilinear canopy cover.

FIG. 2 shows an example of a curvilinear canopy cover 130 configured to connect to the mounting bracket 100 and extend over the mounting bracket 100, and the junction box 106. The canopy cover 130 includes a bottom wall 132 and one or more side walls 134 defining an interior with a top opening. The illustrated embodiment shows a single, circumferential wall. Other embodiments can include other rectilinear and curvilinear configurations. One or more openings 136 can be positioned in the bottom wall 132 to receive one or more fasteners for connecting the canopy cover 130 to the mounting bracket 100, for example through engagement with the lower flanges 122. The opening can be at least partially defined by a boss extending from the bottom wall 132 to vertically offset the mounting bracket form the bottom wall 132. By connecting to the mounting bracket 100, the canopy cover 130 is mounted to the support surface 104 and is independent of (i.e., not mounted to) the junction box 106. The canopy cover 130 can also include a central opening in the bottom wall 132 to allow the passage of conductors to a light fixture.

One or more conduit openings are formed in the side wall 134 of the canopy cover 130. The conduits openings can have a substantially U-shaped configuration and releasably receive one or more inserts. Although four conduit openings are shown, fewer or more conduit openings can be provided in accordance with an associated junction box. In an exemplary embodiment, two types of inserts can be provided—cover inserts 138 and a conduit inserts 140.

The cover inserts 138 include a body that substantially fills the conduit openings and include an outer surface that is substantially flush with the outer surface of the side wall 134 and an upper edge that is substantially flush with the upper edge of the side wall 134. The cover inserts 138 include a leg extending down toward the bottom wall 132 of the canopy cover 130. An opening can be provided in the leg so that a fastener can secure the cover inserts 138 to the canopy cover 130.

The conduit inserts 140 include a substantially U-shaped body having a slot that is configured to receive the conduit 108 when the canopy cover 130 is positioned over the junction box 106. The U-shaped body extends from the outer surface of the side wall 134. The conduit inserts 140 also include a leg extending down toward the bottom wall 132 of the canopy cover 130. An opening can be provided in the leg so that a fastener can secure the conduit inserts 140 to the canopy cover 130.

In use, the conduit inserts 140 can be selectively connected to the canopy cover 130 depending on the number and position of the conduits 108 extending to the junction box 106. The cover inserts 138 can be selectively connected over openings that are not in use.

Figure 3:
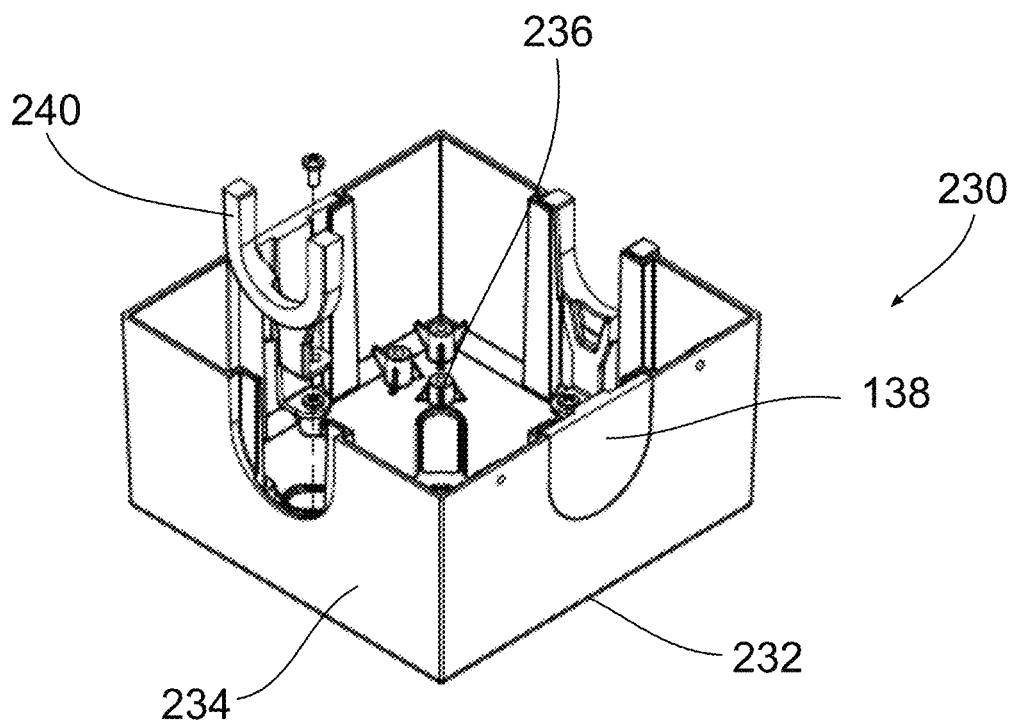
FIG. 3 is a perspective view of a rectilinear canopy cover.

FIG. 3 shows an alternative embodiment of a rectilinear canopy cover 230 that is configured to be connected to a support surface and positioned over a junction box. The canopy cover 230 can be used with junction boxes or light fixture that have a rectilinear configuration. The canopy cover 230 includes a bottom wall 232 and one or more side walls 234 defining an interior with a top opening. The illustrated embodiment shows four side walls 234, however fewer or more walls can be used. Other embodiments can include other rectilinear and curvilinear configurations. One or more openings 236 can be positioned in the bottom wall 232 to receive one or more fasteners for connecting the canopy cover 230 to the mounting bracket 100, for example through engagement with the lower flanges 122. The opening can be at least partially defined by a boss extending from the bottom wall 232 to vertically offset the mounting bracket form the bottom wall 232. By connecting to the mounting bracket 100, the canopy cover 230 is mounted to the support surface 104 and is independent of (i.e., not mounted to) the junction box 106. The canopy cover 230 can also include a central opening in the bottom wall 232 to allow the passage of conductors to a light fixture.

One or more conduit openings are formed in the side wall 234 of the canopy cover 230. The conduits openings can have a substantially U-shaped configuration and releasably receive one or more inserts. In an exemplary embodiment, two types of inserts can be provided—cover inserts 238 and a conduit inserts 240.

The cover inserts 238 include a body that substantially fills the conduit openings and include an outer surface that is substantially flush with the outer surface of the side wall 234 and an upper edge that is substantially flush with the upper edge of the side wall 234. The cover inserts 238 include a leg extending down toward the bottom wall 232 of the canopy cover 230. An opening can be provided in the leg so that a fastener can secure the cover inserts 238 to the canopy cover 130.

The conduit inserts 240 include a substantially U-shaped body having a slot that is configured to receive the conduit 108 when the canopy cover 230 is positioned over the junction box 106. The U-shaped body extends from the outer surface of the side wall 234. The conduit inserts 240 also include a leg extending down toward the bottom wall 232 of the canopy cover 230. An opening can be provided in the leg so that a fastener can secure the conduit inserts 240 to the canopy cover 230.

In use, the conduit inserts 240 can be selectively connected to the canopy cover 230 depending on the number and position of the conduits 108 extending to the junction box 106. The cover inserts 238 can be selectively connected over openings that are not in use.

Figure 4:
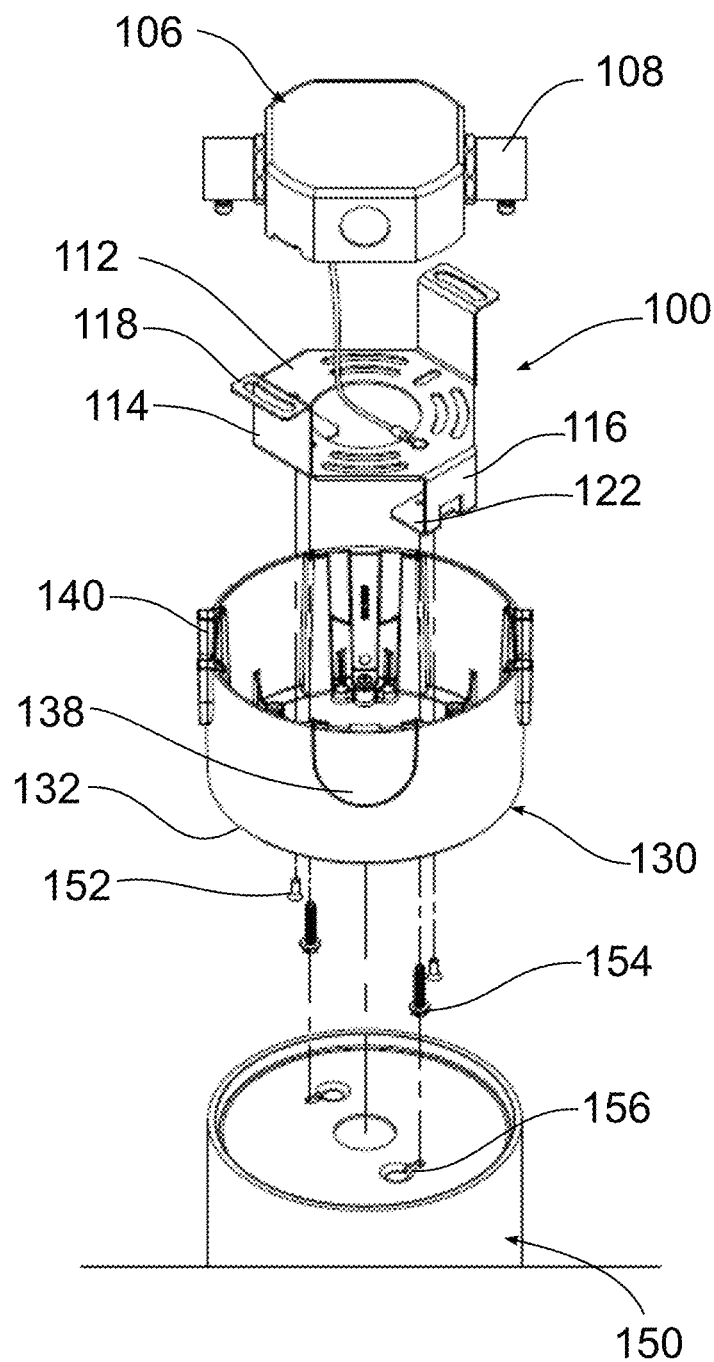
FIG. 4 is an assembly view of a junction box, mounting bracket, curvilinear canopy cover, and cylindrical light fixture.

FIG. 4 shows an exemplary assembly of the mounting bracket 100 and the curvilinear canopy cover 130 with a cylindrical light fixture 150. The mounting bracket 100 can be positioned so that the upper arms 114 extend around the sides of the junction box 106 and the upper flanges 118 are engaged with a support surface. One or more fasteners can be inserted through the upper flanges 118 to secure the mounting bracket to the support surface around the junction box 106. Conductors can be run through the central opening in the central body 112 of the mounting bracket 100 to be connected to one or more light emitters contained tin the light fixture iso.

The canopy cover 130 can be outfitted with a pair of cover inserts 138 and a pair of conduit inserts 140. The conduit inserts 140 are aligned with a conduit 108 extending from the junction box 106. The canopy cover 130 is then connected to the mounting bracket 100 so that it covers the mounting bracket 100 and the junction box 106. A first set of fasteners 152 can extend through the bottom wall 132 of the canopy cover 130 to connect to openings in the lower flanges 122 of the mounting bracket 100, securing the canopy cover 130 to the mounting bracket 100. A second set of fasteners 154 can be used to connect the light fixture 150 to the canopy cover 130. The fasteners 154 can be threadably secured to the canopy cover 130 and the light fixture 150 can include a set of key-hole slots 156 that receive the fasteners 154 to releasably secure the light fixture to the canopy cover 130.

Figure 5:
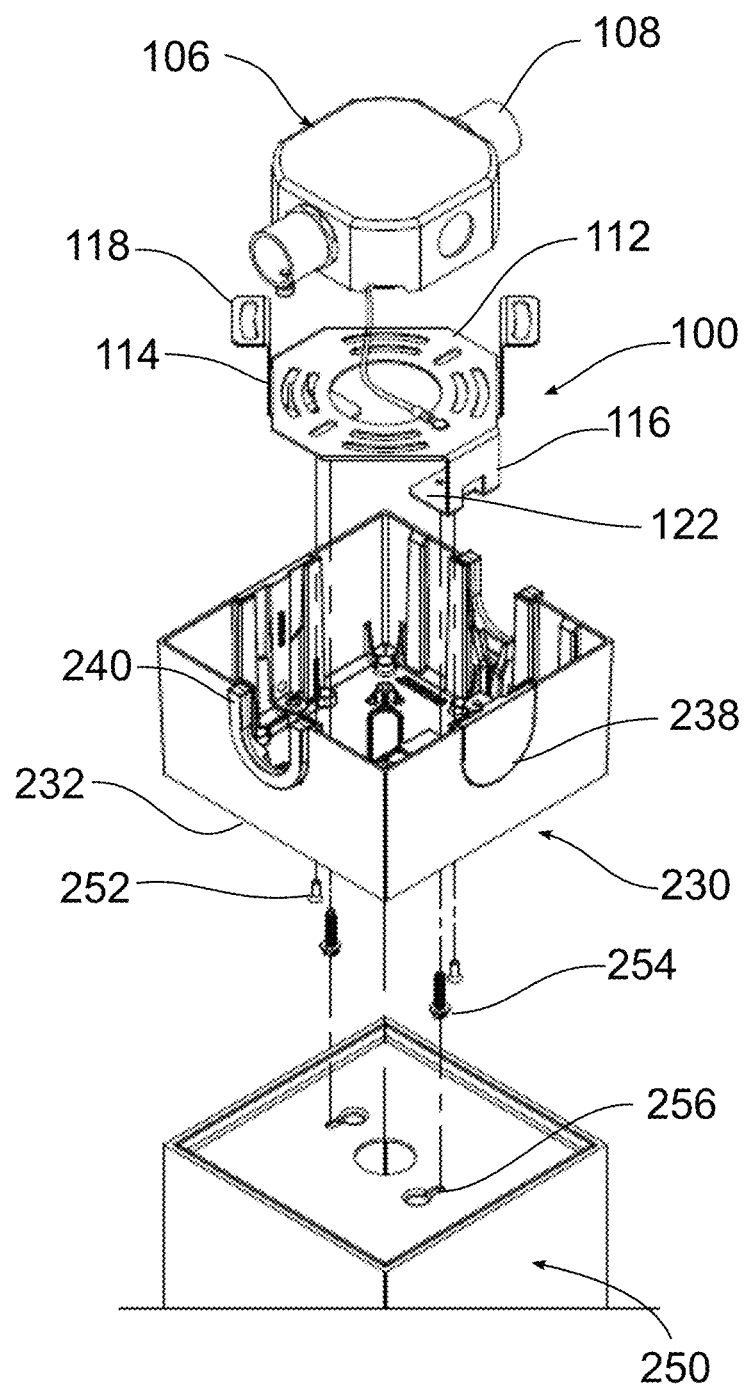
FIG. 5 is an assembly view of a junction box, mounting bracket, rectilinear canopy cover, and rectangular light fixture.

FIG. 5 shows an exemplary assembly of the mounting bracket 100 and the rectilinear canopy cover 230 with a rectilinear light fixture 250. The mounting bracket 100 can be positioned so that the upper arms 114 extend around the sides of the junction box 106 and the upper flanges 118 are engaged with a support surface. One or more fasteners can be inserted through the upper flanges 118 to secure the mounting bracket to the support surface around the junction box 106. Conductors can be run through the central opening in the central body 112 of the mounting bracket 100 to be connected to one or more light emitters contained tin the light fixture 250.

The canopy cover 230 can be outfitted with a pair of cover inserts 238 and a pair of conduit inserts 240. The conduit inserts 240 are aligned with a conduit 108 extending from the junction box 106. The canopy cover 230 is then connected to the mounting bracket 100 so that it covers the mounting bracket 100 and the junction box 106. A first set of fasteners 252 can extend through the bottom wall 232 of the canopy cover 230 to connect to openings in the lower flanges 122 of the mounting bracket 100, securing the canopy cover 130 to the mounting bracket 100. A second set of fasteners 254 can be used to connect the light fixture 250 to the canopy cover 230. The fasteners 254 can be threadably secured to the canopy cover 230 and the light fixture 250 can include a set of key-hole slots 256 that receive the fasteners 254 to releasably secure the light fixture to the canopy cover 230.

In certain aspects, the light emitters positioned in the light fixtures can be filament type light fixtures, or LED light fixtures. Using LED light emitters can require a main power supply to be converted from AC-DC. Certain lighting functions can also require voltage and current control of the power supplied to the LEDs. This is especially true when the light fixture is used with a dimming control or a color tuning control. In certain embodiments, the LEDs can be AC driven to the light fixtures, such as with driver-on-board type light emitters. Other LED light emitters can require a separate driver unit that controls the power supplied to the LEDs.

Figure 6:
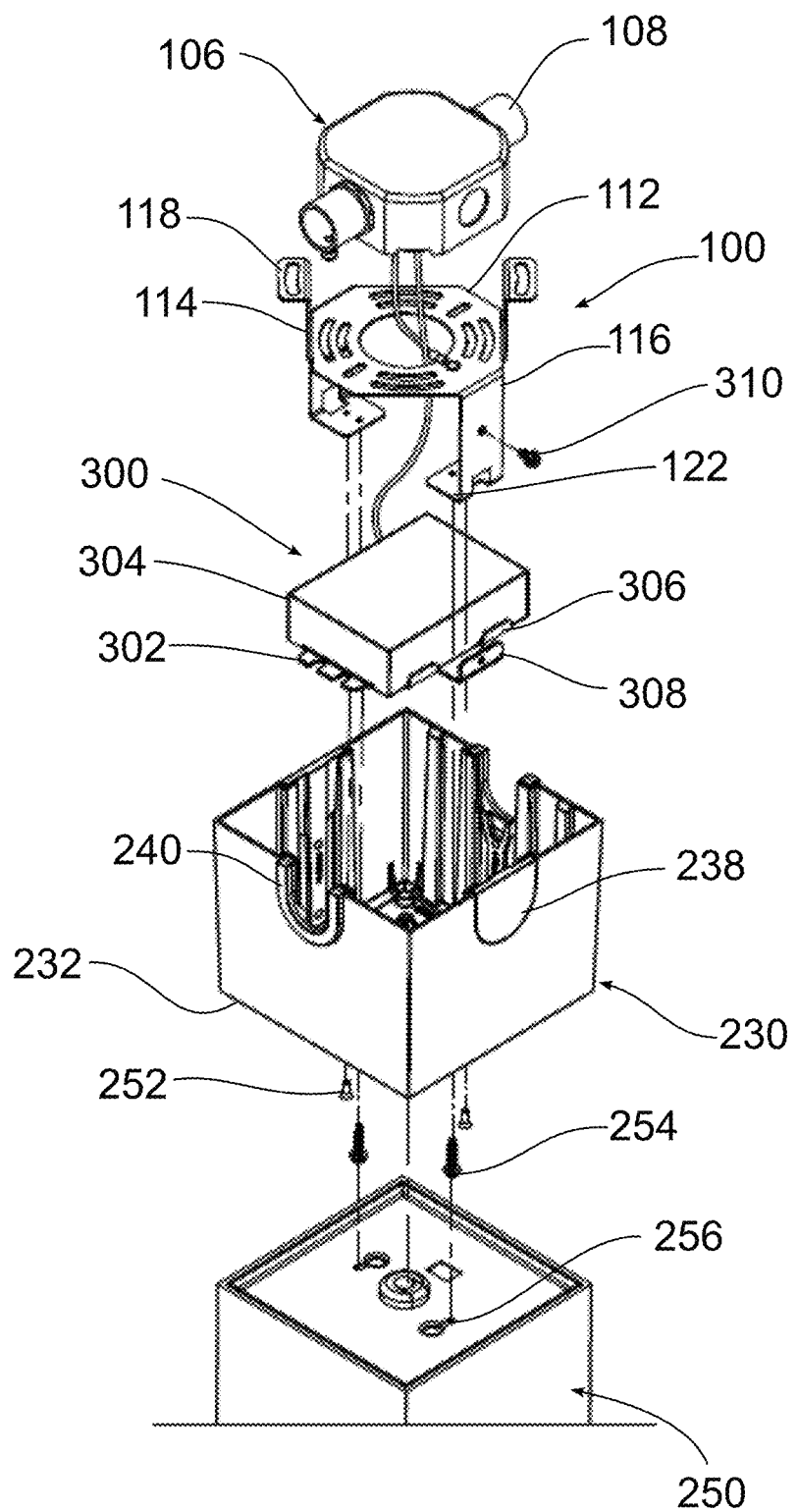
FIG. 6 is an assembly view of a junction box, mounting bracket, driver unit, rectilinear canopy cover, and rectangular light fixture.

FIG. 6 shows an exemplary assembly of driver unit 300 that is connected to the mounting bracket 100 for use with the rectilinear canopy cover 230 and the rectilinear light fixture 250. The mounting bracket 100, canopy cover 230 and light fixture 250 can all be connected as described with respect to FIG. 5. The driver unit 300 can include a tray 302 and a driver housing 304 connected to the tray 302. The tray 302 is configured to support the driver housing 304, and can have any size, shape, or combination of structural features needed. The driver housing 304 can be the housing supplied by the driver manufacture as part of the driver or can be a separate housing that is used to enclose one or more commercial drivers. The tray 302 includes one or more side tabs 306 that receive the driver housing 304. The tray 302 also includes one or more side flanges 308 that connect the tray 302 to the mounting bracket 100. In certain embodiments, the driver unit 300 is positioned between the lower arms 116, the lower flanges 122, and the central body 112 of the mounting bracket 100. The side flanges 308 can include an opening that receives a fastener 310 that extends through the lower arms 116 to releasably secure the driver unit 300 to the mounting bracket 100. In certain embodiments, the driver unit 300 can also be connected to the interior of the canopy cover 230. The driver unit 300 can be used with other canopy covers, such as the cylindrical canopy cover 130, other light fixtures, and in connection with other components described herein.

In certain embodiments, a light fixture can be used in conjunction with a control component that provides both power and data control aspects. For example a control node can provide power distribution architecture and data connectivity to create a fully functioning Power over Ethernet (PoE) lighting control system. These control nodes can replace standard drivers and can receive inputs from various user control switches and sensors. The control nodes can be programmed and communicate bi-directionally, for example over a CAT 5e/6 cable that connects directly to the control node. Master nodes can receive data and power from a PoE network switch and pass along the power and data downstream to any daisy-chained satellite nodes. Connected light fixtures with nodes can be automatically discovered by a gateway, or other software program which can expedite commissioning and administering immediate feedback. Each master node can be DHCP-enabled and can automatically receive an IP address from the local network to simplify installation and setup. One commercial example of such a system is the PowerHUBB™ Node system provided by Hubbell Control Solutions. Other types of control components including wireless and wired communication devices, controllers, and sensors can also be used separately or in conjunction with the control nodes to control aspects of the light fixture and the light output therefrom.

Figure 7:
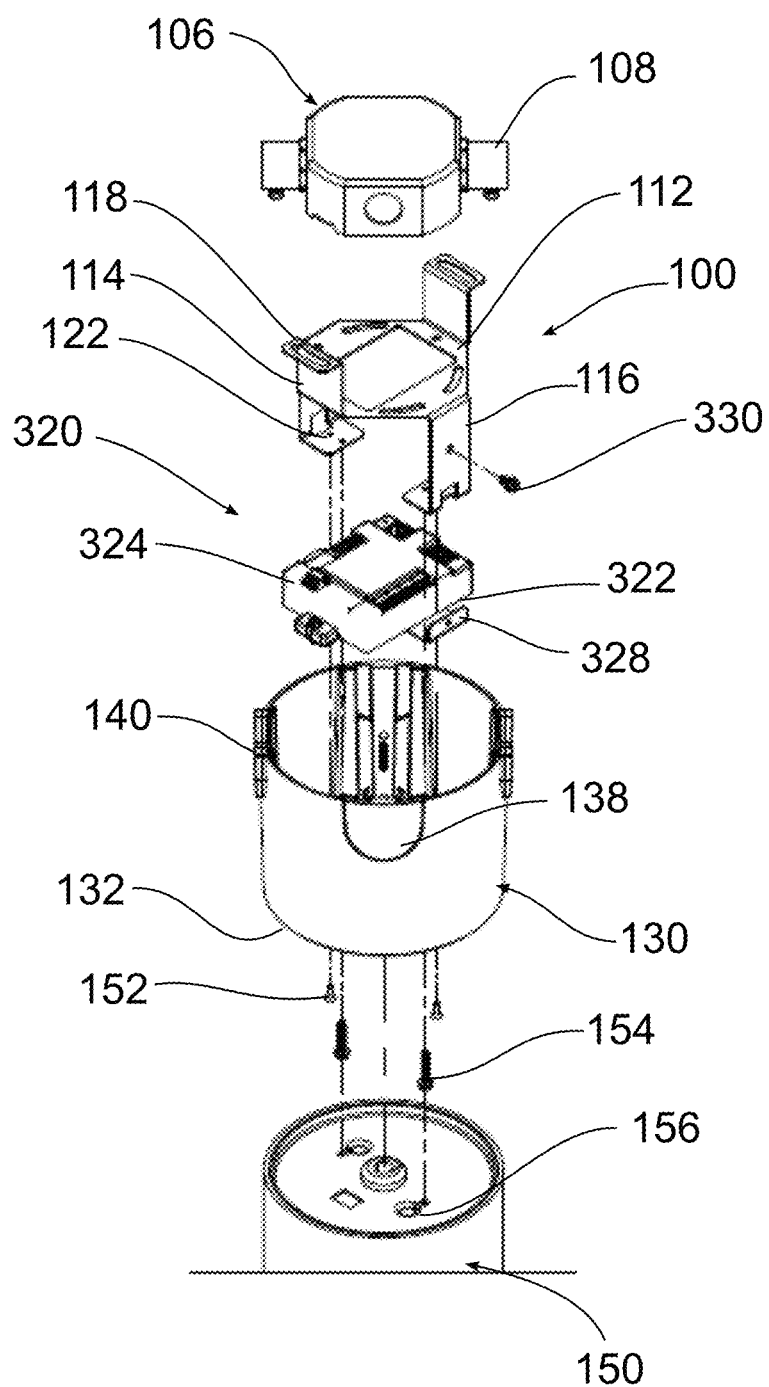
FIG. 7 is an assembly view of a junction box, mounting bracket, control unit, curvilinear canopy cover, and cylindrical light fixture.

FIG. 7 shows an exemplary assembly of control unit 320 that is connected to the mounting bracket 100 for use with the cylindrical canopy cover 130 and the cylindrical light fixture 150. The mounting bracket 100, canopy cover 130 and light fixture 150 can all be connected as described with respect to FIG. 4. The control unit 320 can include a tray 322 and a node 324 connected to the tray 322. The tray 322 is configured to support the node 324, and can have any size, shape, or combination of structural features needed. The tray 322 can include one or more side flanges 328 that connect the tray 322 to the mounting bracket 100. In certain embodiments, the control unit 320 is positioned between the lower arms 116, the lower flanges 122, and the central body 112 of the mounting bracket 100. The side flanges 328 can include an opening that receives a fastener 330 that extends through the lower arms 116 to releasably secure the control unit 320 to the mounting bracket 100. In certain embodiments, the control unit 320 can also be connected to the interior of the canopy cover 130. The control unit 320 can be used with other canopy covers, such as the rectilinear canopy cover 230, other light fixtures, and in connection with other components described herein. The control unit 320 can also include other control components in place or in connection with the node 324.

Figure 8:
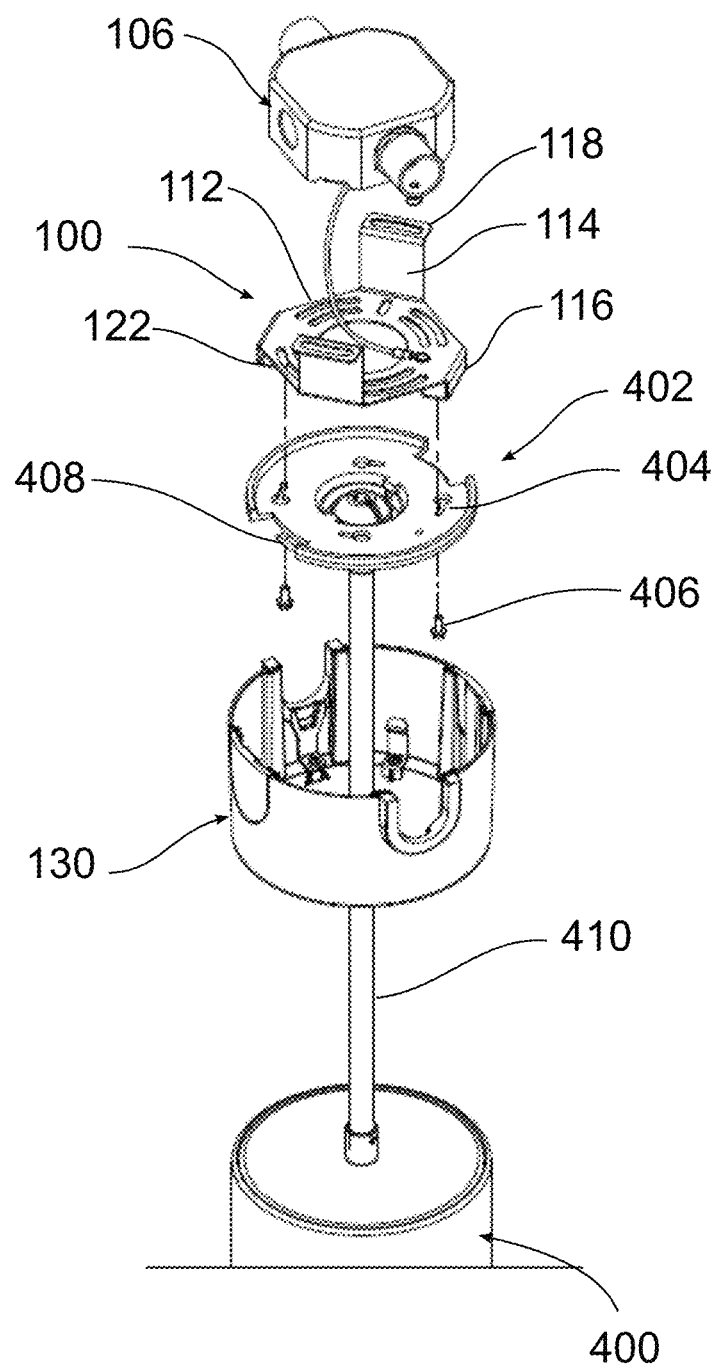
FIG. 8 is an assembly view of a junction box, mounting bracket, hanging connector, curvilinear canopy cover, and cylindrical light fixture.

FIG. 8 shows an exemplary assembly of the mounting bracket 100 and the curvilinear canopy cover 130 with a light fixture 400 and a hanging connector 402. The hanging connector 402 includes an outer flange having one or more key slots 404. The key slots 404 receive a fastener 406 axially through a first portion of an opening and the hanging connector 402 can be rotated so that the head of the fastener 406 is then moved into a second, smaller portion of the opening. The fasteners 406 can be connected to the lower flanges 122 of the mounting bracket 100. Using the key slots 404, the hanging connector 402 can be releasably connected to the mounting bracket 100 without having to adjust the fasteners 406. The canopy cover 130 is connected to the hanging connector, for example through a rotatable bayonet connection 408. Other types of releasable connections can also be used. The hanging connector 402 is configured to attach and orient a hanging support 410 for the light fixture 400, for example a pendant or cable hanging light. The hanging support 402 can be used with other light fixtures and canopy covers.

Figure 9:
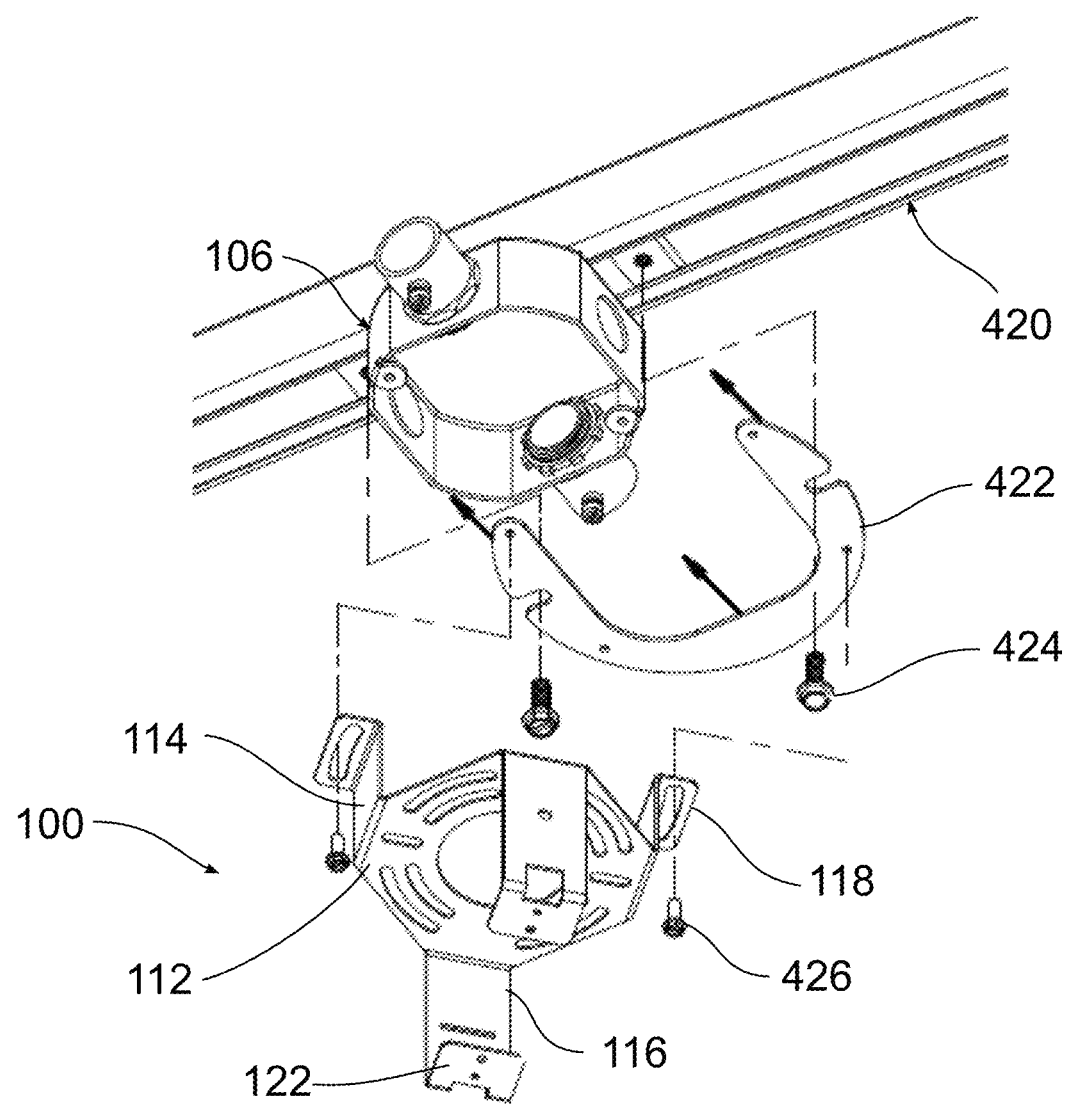
FIG. 9 is an assembly view of a mounting channel, junction box, mounting plate, and mounting bracket.

FIG. 9 shows an exemplary embodiment of the mounting bracket 100 used in connection with a surface mounting channel 420, commonly used for track lighting applications. A mounting plate 422 can be secured to the channel 420 using one or more of a first set of fasteners 424. The mounting bracket 100 is then connected to the mounting plate 422 using a second set of fasteners 426. Various canopy covers, light fixtures, and other associated components can then be connected to the mounting bracket 100.

Figure 10:
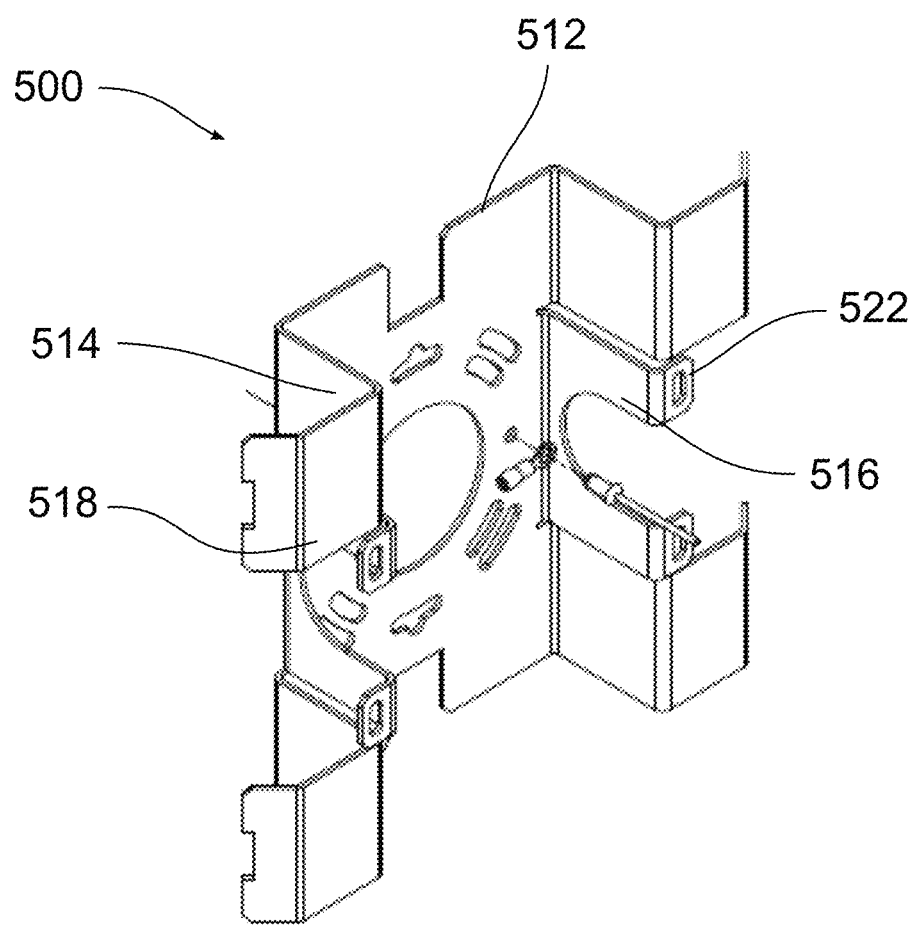
FIG. 10 is a perspective view of another exemplary mounting bracket.

FIG. 10 shows another exemplary embodiment of a mounting bracket 500. The mounting bracket 500 includes a central body 512, one or more outer arms 514, and one or more inner arms 516. The mounting bracket 500 is configured to directly engage and mount to the support surface, so that the mounting bracket 500 is not mounted to a junction box and securing the mounting bracket 500 is independent of the junction box. This allows the mounting bracket 500 to be used with different sized junction boxes, and also eliminates the need to make a direct connection to the junction box which can be difficult for an installer depending on the size and number of cables and connections present in the junction box. In certain exemplary embodiments, the mounting bracket 500 is used in wall-mount configurations.

The central body 512 of the mounting bracket 500 can act as a partial cover of the junction box interior and can have a configuration that matches a certain size or type of junction box. The illustrated embodiment shows a central body 512 having a rectangular configuration. Other sizes and shapes can also be used. The central body 512 has a series of slots and openings that can act as mounting apertures for other components. A central opening extends through the central body 512 to allow conductors or other electrical connectors to extend from the junction box and provide an electrical connection with a light fixture.

One or more outer arms 514 extend from the central body 512 toward the support surface. The illustrated embodiment includes four separate outer arms 514, however, a fewer or more than four arms can also be used. Outer flanges 518 are provided on each of the outer arms 514. The outer flanges 518 can have a first portion extending substantially orthogonal to the outer arms 514 and a second portion extending at an oblique angle to the first portion.

One or more inner arms 516 extend from the central body 512 toward the support surface. The illustrated embodiment includes four separate inner arms 516, however, a fewer or more than four arms can also be used. Inner flanges 522 are provided on each of the inner arms 516. The inner flanges 522 extend substantially orthogonal to the inner arms 516. Openings are provided in the inner flanges 522 to receive a fastener. The fastener can extend through the inner flange 522 and into the support surface to secure the mounting bracket 500 to the support surface.

Figure 11:
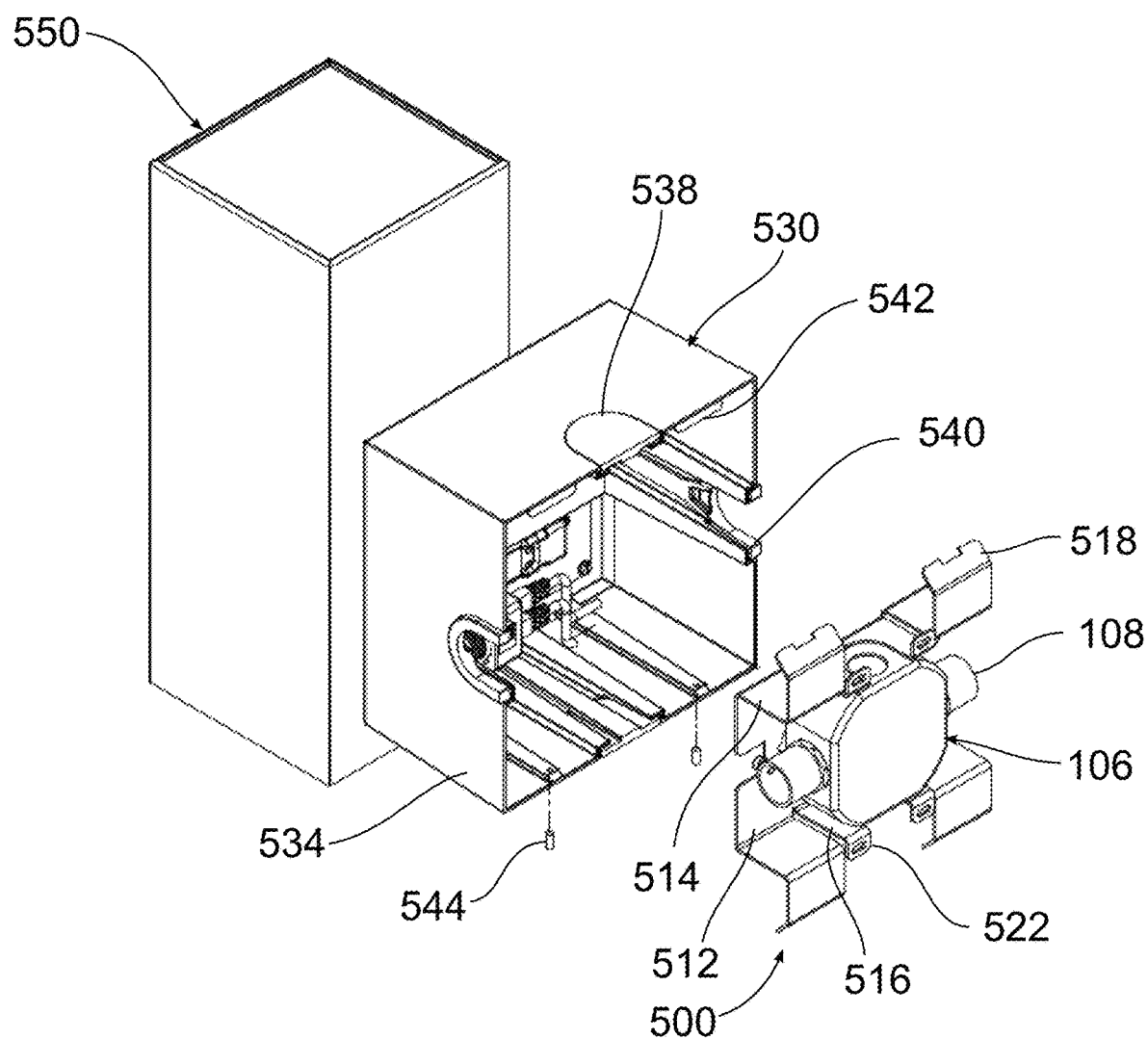
FIG. 11 is an assembly view of a junction box, mounting bracket, canopy cover, and light fixture.

FIG. 11 shows an exemplary assembly of the mounting bracket 500 and a rectilinear wall-mount canopy cover 530 with a rectilinear light fixture 550. The mounting bracket 500 can be positioned so that the outer arms 514 and inner arms 516 extend around the sides of the junction box 106 and the inner flanges 522 are engaged with a support surface. One or more fasteners can be inserted through the inner flanges 522 to secure the mounting bracket 500 to the support surface around the junction box 106. Conductors can be run through the central opening in the central body 512 of the mounting bracket 500 to be connected to one or more light emitters contained tin the light fixture 550.

The canopy cover 530 can be outfitted with a pair of cover inserts 538 and a pair of conduit inserts 540. The conduit inserts 540 are aligned with a conduit 108 extending from the junction box 106. The canopy cover 530 is then connected to the mounting bracket 500 so that it covers the mounting bracket 500 and the junction box 106. The canopy cover 530 can include a set of mounting tabs 542 extending from the outer walls 534. The mounting tabs 542 can be positioned over the upper set of outer flanges 518 and the canopy cover 530 can be supported on the mounting bracket 500. One or more set screws 544 can be inserted through a bottom side wall 534 to engage lower outer flanges 518 and secure the canopy cover 530 to the mounting bracket 500.

Figure 12:
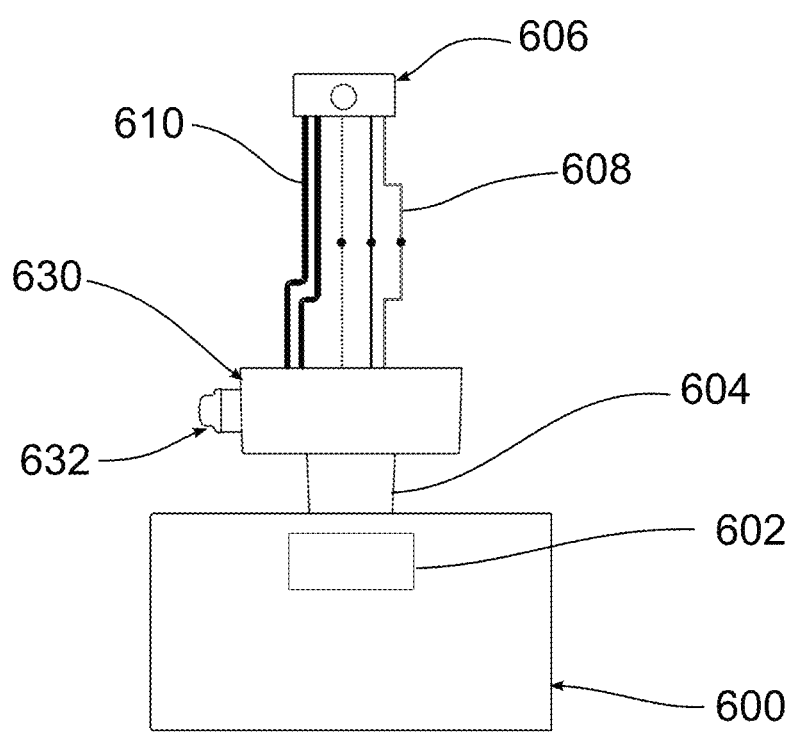
FIG. 12 is a schematic of a junction box, canopy cover, control unit, and light fixture.

FIG. 12 shows an exemplary wiring diagram for a light fixture 600 having a set of light emitters 602. The light fixture 600 is connected to a spacer 604 and to a canopy cover 630. A set of conductors extend between the canopy cover 603 and the junction box 606. The conductors can include power conductors 608 (e.g., line, neutral ground) and data conductors 610 (e.g., ethernet cables). A control unit 632 can be connected to the canopy cover 630. The control unit can provide wireless communication (e.g., Bluetooth™) with other points on a network and can control the light output of the light emitters 602. This output control can include on/off, dimming, color tuning, scheduling, and other common interior lighting functions.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Unless specified or limited otherwise, the terms "mounted," "connected," "supported," and "coupled" and variations thereof are used broadly and encompass both direct and indirect mountings, connections, supports, and couplings.

What is claimed:

1. A canopy assembly for a light fixture comprising:
a mounting bracket configured to be positioned over a junction box and directly mounted to a support surface independently of the junction box;
a canopy cover connected to the mounting bracket, the canopy cover including a plurality of conduit openings;
one or more cover inserts configured to be selectively positioned in the conduit openings; and
one or more U-shaped conduit inserts configured to be selectively positioned in the conduit openings,
wherein the canopy cover is configured to extend over the mounting bracket and the junction box.

2. The canopy assembly of claim 1, wherein the mounting bracket includes a central body and a first arm extending from the central body to engage the support surface.

3. The canopy assembly of claim 2, wherein the first arm includes a flange having an opening for receiving a fastener.

4. The canopy assembly of claim 2, wherein the mounting bracket includes a second arm extending from the central body and wherein the second arm receives the canopy cover.

5. The canopy assembly of claim 4, wherein the second arm extends from the central body in a direction opposite the first arm.

6. The canopy assembly of claim 1, wherein a hanging connector is connected to the mounting bracket.

7. The canopy assembly of claim 1, wherein each of the one or more conduit inserts includes a leg configured to receive a fastener to secure the conduit insert to the canopy cover.

8. The canopy assembly of claim 1, wherein a control component is connected to the mounting bracket and at least partially positioned in the canopy cover.

9. The canopy assembly of claim 8, wherein the control component includes a Power over Ethernet control node.

10. The canopy assembly of claim 8, wherein the control component is connected to tray and the tray is directly connected to the mounting bracket.

11. A canopy assembly for a light fixture comprising:
a mounting bracket configured to be positioned over a junction box and directly mounted to a support surface independently of the junction box, the mounting bracket having a central body, an upper arm extending from the central body in a first direction, and a lower arm extending from the central body in a second direction opposite the first direction;
a canopy cover connected to the mounting bracket, the canopy cover including a plurality of conduit openings;
one or more cover inserts configured to be selectively positioned in the conduit openings; and
one or more conduit inserts configured to be selectively positioned in the conduit openings,
wherein the canopy cover is configured to extend over the mounting bracket and the junction box.

12. The canopy assembly of claim 11, wherein the upper arm includes an upper flange having an opening for receiving a fastener to engage the support surface.

13. The canopy assembly of claim 11, wherein the lower arm includes a lower flange having an opening for receiving a fastener to engage the canopy cover.

14. The canopy assembly of claim 11, wherein the mounting bracket includes a second upper arm and wherein the junction box is received between the upper arm and the second upper arm when the mounting bracket is attached to the support surface.

15. The canopy assembly of claim 11, wherein a control component unit is connected to the mounting bracket and at least partially positioned in the canopy cover.

16. The canopy assembly of claim 15, wherein the control component unit includes a tray and the tray is secured to the mounting bracket by a fastener.

17. A canopy assembly for a light fixture comprising:
a mounting bracket configured to be positioned over a junction box and directly mounted to a support surface independently of the junction box, the mounting bracket having a central body, an upper arm extending from the central body in a first direction, and a lower arm extending from the central body in a second direction opposite the first direction;
a tray connected to the lower arm beneath the central body, the tray supporting a control component configured to be connected to a light emitter;
a canopy cover connected to the mounting bracket, the canopy cover including a plurality of conduit openings;
one or more cover inserts configured to be selectively positioned in the conduit openings; and
one or more conduit inserts configured to be selectively positioned in the conduit openings.

18. The canopy assembly of claim 17, wherein the control component includes a driver.

19. The canopy assembly of claim 17, wherein the control component includes a Power over Ethernet control node.

20. The canopy assembly of claim 17, wherein the mounting bracket includes a lower flange extending from the lower arm and the tray is connected to the mounting bracket between the central body and the lower flange.

* * * * *